Feb. 25, 1958 F. R. ABBOTT 2,825,043

MAGNETIC TYPE TIME COMPENSATOR FOR BEAM STEERING

Filed April 20, 1954 2 Sheets-Sheet 1

INVENTOR.
FRANK R. ABBOTT

BY George Sipkin
George E. Pearson
ATTORNEYS

United States Patent Office 2,825,043
Patented Feb. 25, 1958

2,825,043

MAGNETIC TYPE TIME COMPENSATOR FOR BEAM STEERING

Frank Riley Abbott, San Diego, Calif.

Application April 20, 1954, Serial No. 424,530

18 Claims. (Cl. 340—16)

(Granted under Title 35, U. S. Code (1952), sec. 266)

The invention described herein may be manufactured and used by or for the Government of the United States of America for governmental purposes without the payment of any royalties thereon or therefor.

The invention relates to an improved time compensator for beam steering of the magnetic recording type and more particularly to a time compensator of the magnetic recording type in which a plurality of similar signals spaced in time are received on recording cartridges mounted in a recording assembly and transferred onto a magnetic surface and reproducing cartridges which are so arranged as to pick up all signals at the same time.

The present invention also relates to an improved time compensator for beam steering in which a plurality of similar signals spaced in time may be transmitted from an antenna array in such manner that receivers in a predetermined direction will receive a coherent signal which is the arithmetic summation of all signals correctly compensated for the time delay between the signals transmitted. Receivers in all other directions receive a plurality of signals spaced in time corresponding to the intervals at which the signals were being transmitted. However, for purposes of simplification of the description, the invention will hereafter be described as a time compensator and signal direction finder in which the device is used to compensate for the time delay in receiving a plurality of signals closely spaced in time intervals as the result of an array of sound detecting devices being at various distances from a sound source from an unknown direction.

Time compensators of the electromagnetic type employing mechanical switching are very expensive to manufacture and maintain, consist of a number of moving parts and are very complicated to operate. Moreover, they require the use of signal receiving devices in the field to be in a linear array which is sometimes difficult to arrange, particularly on land.

Time compensators of the magnetic storage type in present use comprise a cylindrical drum or disc whose exterior surface is adapted to record similar signals at intervals corresponding to the relative distances of the field receivers from the signal source. The signals are then picked up at the same time by recording cartridges adjusted to compensate for the time interval between the recorded signals with the result that one signal is produced instead of several signals at closely spaced time intervals. One disadvantage of this type is that in adjusting the recording cartridges to compensate for the time interval, it is difficult to maintain uniform proximity between the recording cartridge and the cylindrical drum or disc.

The present invention utilizes the same principle as the magnetic recording time compensator employing a cylindrical magnetic drum or disc in that the spaced signal impulses are received on the magnetic surface and the recording cartridges are adjusted to compensate for the time interval so that a single signal is reproduced. However, the present invention alleviates the difficulty of maintaining uniform proximity between the recording cartridge and the magnetic field by using a spherical ball instead of a cylindrical drum or disc and shaping the recording assembly to conform to the curvature of the sphere throughout its adjustment.

The present invention is a further improvement over previously used devices in that the recording assembly and the reproducing assembly are similarly shaped and adapted to be counter-rotated in adjustment to compensate for the time interval between the incoming signals. The extent of the rotation of the pickup assembly determines the direction of the signal source with respect to a predetermined point on an established reference line.

It is therefore an object of this invention to provide a time compensator which is inexpensive to manufacture, easy to maintain and simple to operate.

Another object is to provide a time compensator in which the recording assembly and the reproducing assembly are manually adjustable to compensate for the time delay in signal pickup among the several signal receiving devices.

Another object is to provide a time compensator in which the pickup assembly and the reproducing assembly are rotatable in adjustment to compensate for the time delay in signal pickup among the several signal receiving devices.

It is a further object of this invention to provide a rotating magnetic signal recording element in which a first signal is impressed upon the recording element and as the element revolves, a second signal is derived at such delayed interval from the first that the pickup assembly will reproduce both signals at the same time.

A further object of the invention is the provision of an indicator to show the angle of rotation of the recording assembly necessary to compensate for the signal time interval and thus show the direction of the signal source from the device.

A further object of the invention is to provide a time compensator in which the recording and reproducing cartridges are maintained in uniform proximity with the rotating magnetic signal recording element and at all times throughout the rotation of the recording and reproducing assemblies are uniformly spaced therefrom.

Other objects and many of the attendant advantages of this invention will be readily appreciated as the same becomes better understood by reference to the following detailed description when considered in connection with the accompanying drawings wherein.

Figure 1:
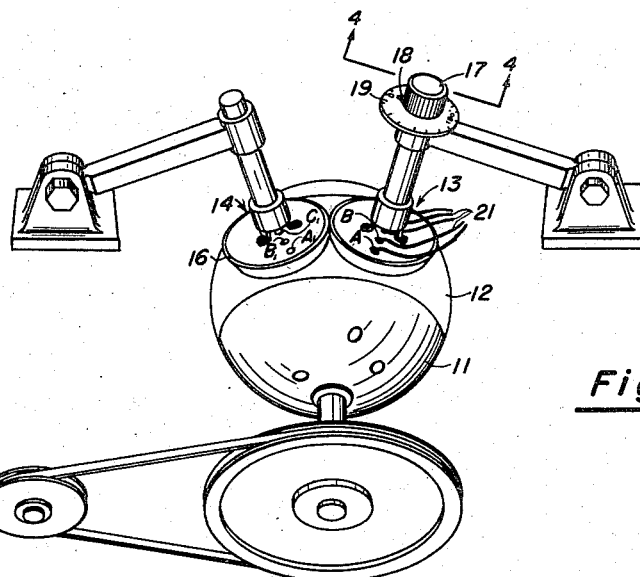
Fig. 1 is a pictorial view of the magnetic type time compensator device.
Figure 2:
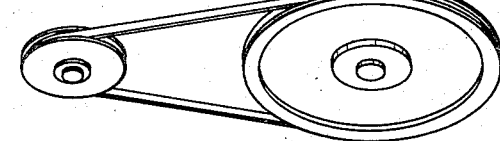
Fig. 2 is a pictorial view of one of the recording cartridges.
Figure 4:
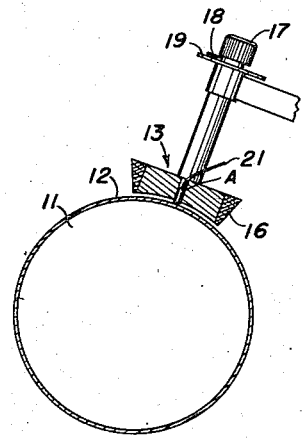
Fig. 4 is a cross sectional view along lines 4—4 of Fig. 1.
Figure 3:
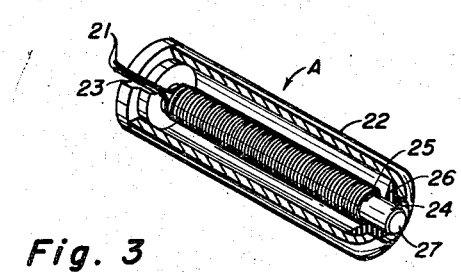
Fig. 3 is a pictorial view of one recording cartridge with parts broken away to expose the inner parts.

Referring now to the drawings, wherein like reference characters designate like or corresponding parts throughout the several views, there is shown in Fig. 1 a sphere, for illustrative purposes shown as an ordinary bowling ball 11, on which is adhered a magnetic belt 12 about its equatorial zone. This belt is of a material having magnetic properties that enable it to record, playback and erase. In close proximity to the belt is suitably mounted a recording assembly 13 and reproducing assembly 14, each adapted to counter-rotate with respect to the other. For purposes of illustration, Fig. 1 shows frictional engagement by means of friction surfaces 16 on each assembly being in contact with each other. However, it is contemplated that other means such as gearing or the like may be used to cause one assembly to counter-rotate in conformance with the movement of the other.

Figure 5:
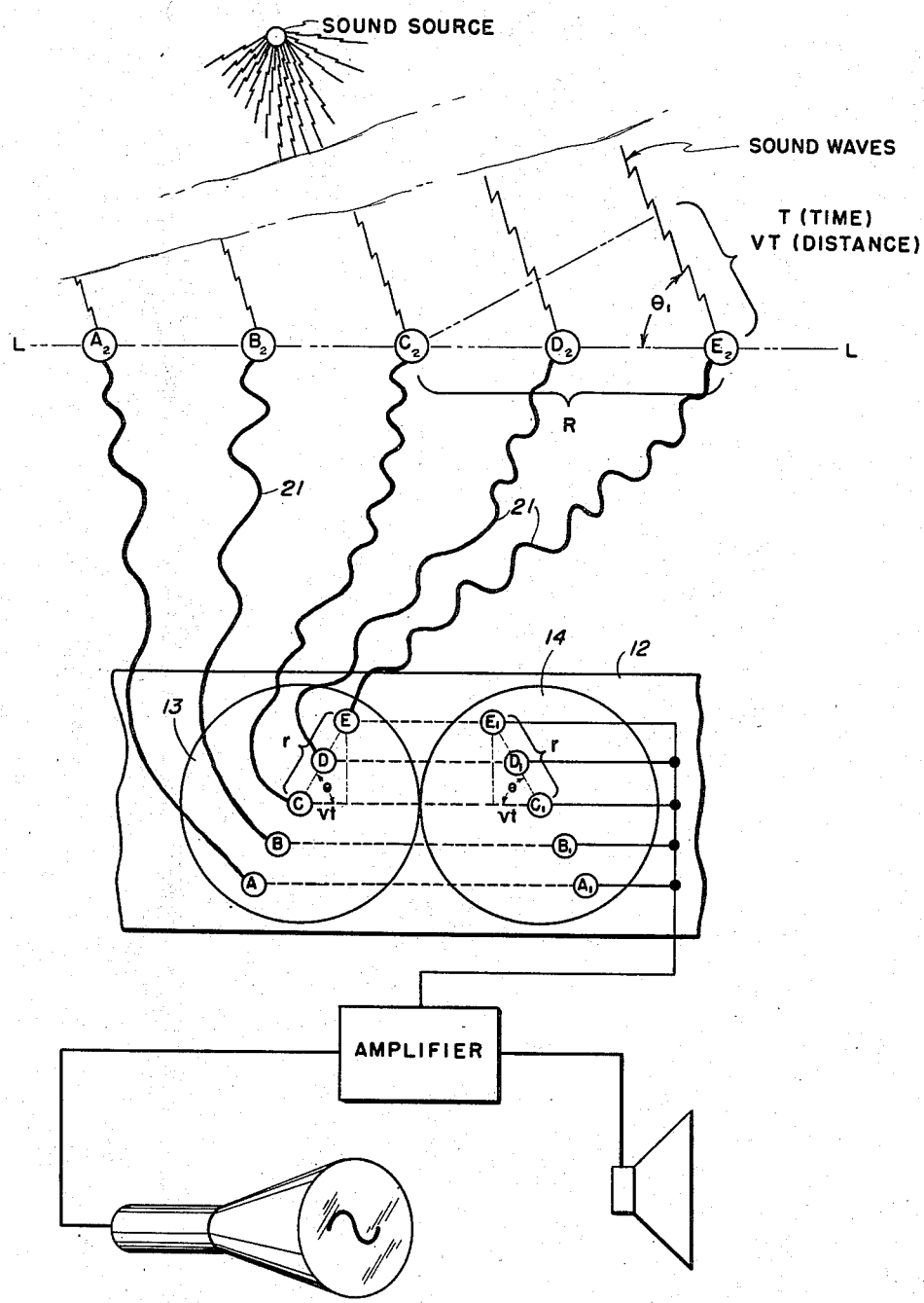
Fig. 5 is a symbolic view showing the relationship between the signal detecting devices and the reproducing and recording cartridges mounted in the device.

Mounted on the recording assembly are the recording cartridges A, B, C, D, E corresponding in position and arrangement to the field sound detectors $A_2$, $B_2$, $C_2$, $D_2$, $E_2$, as shown in Fig. 5. For purposes of illustration the field sound detectors and their images, the recording cartridges arranged in miniature replica of the actual array, are placed in a straight line, although in actual practice they may also be irregularly spaced, and in circular, hexagonal or other form of array.

Reproducing cartridges $A_1$, $B_1$, $C_1$, $D_1$, $E_1$, are similarly arranged in the producing assembly 14 so that $A_1$ is in alignment with A, $E_1$ is in alignment with E, and so forth, so that the signal recorded by A will be picked up by $A_1$, the signal recorded by E will be picked up by $E_1$. As the assemblies are counter-rotated, the distances between A—$A_1$, B—$B_1$, E—$E_1$, etc., will vary.

Referring now to Fig. 5 first assume that the sound detectors are connected directly to the amplifier and the present invention is not used. Sound waves coming from the sound source S reach detector $A_2$ first and successively reach $B_2$, $C_2$, $D_2$, and $E_2$, as each is spaced further away from the source S. The detectors pick up the signal as a multiple of identical signals closely spaced in time intervals. The loudspeaker would reproduce the signal with a series of echoes closely spaced in time. With the present invention employed, and adjusted for the time delay interval, the oscilloscope records the arithmetic sum of all signals and the speaker would reproduce the signal without echo. The time interval between the time when detector $C_2$ picks up the signal and the time the signal is picked up by detector $E_2$ is designated as T. In order for the oscilloscope to show a coherent signal and the speaker to report a signal without echo, the recording and reproducing assemblies must be counter-rotated so that the time required for the signal to move from cartridge E to cartridge $E_1$ is T faster than the time it takes for the signal to move from cartridge A to cartridge $A_1$. In this manner the signal from detector $E_2$ received later than the signal from detector $A_2$, catches up with it and is reported on the oscilloscope and speaker at the same time as the signal from detector $A_2$. By measuring the angle of rotation of the recording assembly, the direction of the sound source S is apparent.

The relative distances of each recording cartridge from the axis of rotation of the assembly, the velocity of the magnetic belt and the angle of rotation of the assembly must all be considered in determining the time delay of the signal from $A_2$ necessary to compensate for the time interval until detector $E_2$ picks up the signal. This is computed as follows: The time delay for the recording cartridge E at radius $r$ from the axis of rotation and at an angle $\theta$ from the direction of movement of the magnetic belt is given by $$t = \frac{r \cos \theta}{v}$$

where $v$ is the velocity of the magnetic belt. But the same delay occurs in the reproducing assembly so that the total delay of signal $A_2$ in the time delay device is $$T = 2t = \frac{2r \cos \theta}{v}$$

In the example shown it is convenient to show the recording assembly using cartridge C as the reference point, i. e., the axis of rotation of the recording assembly. This, in turn, requires that device $C_2$ in the field array be designated as the reference point in the field. A signal being received by the corresponding detector $E_2$ in the field array from a direction $\theta_1$, with respect to its direction from a reference line L—L in the array must be advanced in time by the amount $$T = \frac{R \cos \theta_1}{V}$$

in which R is the distance between the field detector and the field reference point $C_2$, and V is the velocity of sound. Thus, when the time compensating device is in correct adjustment, the angle $\theta$ of radius line $r$ through cartridge E with respect to the direction of movement of the magnetic belt is equal to angle $\theta_1$ and therefore $$T = \frac{2r \cos \theta}{v} = \frac{R \cos \theta_1}{V} \text{ or } \frac{v}{V} = \frac{2r}{R}$$

Thus, the time delay device provides the correct delay when the velocity of the magnetic belt $v$ is related to the velocity of sound V as twice the radius of the cartridge from the axis of rotation of the recording assembly is related to the distance from reference point $C_2$ to the detector $E_2$ receiving the signal at a later time. For example, if the recording cartridges are a replica of one/one-hundreth the size of the field array, the velocity of the magnetic belt must be two/one-hundreths the velocity of the sound waves.

The angle $\theta_1$ of the sound source from the reference line in the field array is measured by the rotation of the recording head assembly 13. Mounted on the head assembly rotating knob 17 is an indicating arrow 18 which indicates angle $\theta$ on scale 19.

The recording assembly 13 and reproducing assembly 14 are cupped on the bottom in such manner as to fit the curvature of the sphere 11 throughout the rotation of the assemblies. In this manner the recording and reproducing cartridges are always equidistant from the magnetic belt 12. The assemblies may be made of wood, plastic or other material suitable for drilling of holes and the insertion of the cartridges therein. The recording cartridges are suitably connected to the sound detecting devices by suitable electrical connections 21. The leads from the reproducing cartridges are joined for connection to an oscilloscope or loudspeaker or other device to indicate when the assemblies are correctly rotated and a time compensated signal is produced.

Each recording and reproducing cartridge comprises an outer high permeability metal barrel 22 with slot 23 along one side and partially closed on the end. Centrally mounted inside the barrel 22 is an annealed core 24 of similar material with tip 27 substantially flush with the end of the barrel. Around the core is wrapped about 500 turns of #31 wire 25. Micarta 26 or other suitable insulating material is used to space the core and windings and insulate them from the outer barrel. This type of cartridge will have the same reaction upon the magnetic belt regardless of the direction of movement of the magnetic belt across the tip 17.

It is within the scope of this invention to modify the above described device by adapting a magnetic belt to revolve between two cylinders, providing a substantially flat surface upon which the recording and reproducing assemblies are placed in close proximity. In such case the bottom surfaces of the assemblies are flat instead of curved so that the cartridges are equidistant from the belt at all times during rotation of the assemblies.

*Operation*

The operation of the time compensator is as follows: First, an array of signal detectors are placed in the field and a miniature replica of their positions are placed on the recording assemblies with recording cartridges and suitable connections, preferably of equal length, are made between the signal devices and the cartridges. A reference line L—L is established in the field from which the direction of the sound source may be determined. Reference point $C_2$ is also established, corresponding with the axis of rotation of the reproducing assembly. The recording head is then rotated to be in alignment with the field array and the direction of the indicator on the turning knob is noted. This is the reference point on the scale below the indicator from which the direction of the sound source will be measured. Next the reproducing cartridges are arranged on the reproducing assembly to be identical with the cartridges on the recording assembly. Each reproducing cartridge then picks up from the magnetic belt the signal impressed thereon by its counterpart on the recording assembly. As the assemblies counterrotate the corresponding cartridges are always in alignment with each other. The velocity of the magnetic belt is then adjusted to its correct speed according to the formula $v/V = 2r/R$ in which $v=$the magnetic belt velocity, $V=$the velocity of the sound waves through the medium surrounding the field array, i. e., air, water, etc., $r=$the distance of the recording cartridge from the axis of rotation of the assembly and $R=$the distance between the detector $E_2$ and the established reference point $C_2$. The reproducing cartridges are then connected to a suitable amplifier and from there to an oscilliscope, loudspeaker or other means for determining when the time delay has been corrected. After the system has been set into operation, the recording assembly is rotated until the time delay has been corrected and the angle of rotation is determined.

Obviously many modifications and variations of the present invention are possible in the light of the above teachings. It is therefore to be understood that within the scope of the appended claims the invention may be practiced otherwise than as specifically described.

What is claimed is:

1. Apparatus of the type described comprising in combination compensating means for a plurality of energy detecting devices in spaced relationship to compensate for the time delay between the time the energy signal reaches the closest detector to the energy source and the time the same signal reaches the other detectors, and means to determine when the time delay has been correctly adjusted, said compensating means comprising recording cartridges mounted in a rotatable assembly, reproducing cartridges mounted in a second rotatable assembly, said assemblies mounted to counter rotate with respect to each other, each responsive to the movement of the other, a revolving magnetic belt moving in a direction from said recording assembly to said reproducing assembly, said cartridges mounted in said assemblies being in close proximity to, and at all times equidistant from, said belt throughout the rotation of said assemblies.

2. Apparatus of the type described comprising in combination compensating means for a plurality of energy detecting devices to compensate for the time delay between the time the energy signal reaches the closest detector to the energy source and the time the same signal reaches the other detectors, and means to determine when the time delay has been correctly adjusted, said compensating means comprising a recording assembly with recording cartridges arranged in miniature replica of the arrangement of said energy detecting devices, a magnetic belt capable of receiving energy signals from said recording cartridges, a reproducing assembly with reproducing cartridges in identical arrangement with the arrangement of said recording cartridges on said recording assembly, both assemblies capable of being counter rotated such that said reproducing cartridges are in alignment on the same magnetic tracks on the magnetic belt as their corresponding recording cartridges, both assemblies being capable of rotation until the time delay between said energy detecting devices has been adjusted.

3. Apparatus of the type described comprising in combination compensating means connected with a plurality of energy detecting devices to compensate for the time delay between the time the energy signal reaches the closest detector to the energy source and the time the same signal reaches the other detectors, and means to determine when the time delay has been correctly adjusted, said compensating means comprising a revolving sphere with a magnetic recording belt thereon, recording and reproducing assemblies mounted to be rotated in close proximity to said revolving sphere, a plurality of cartridges mounted in said assemblies, said assemblies being curved to conform with the curvature of the sphere at all points of close proximity, said cartridges being equidistant from said belt at all times throughout the rotation of said assemblies.

4. Apparatus of the type described comprising in combination compensating means connected with a plurality of energy detecting devices to compensate for the time delay between the time the energy signal reaches the closest detector to the energy source and the time the same signal reaches the other detectors, and means to determine when the time delay has been correctly adjusted, said means comprising a rotating recording assembly with cartridges arranged in miniature replica of the arrangement of said energy detecting devices, the energy detecting device last receiving the energy signal being a distance R from the device first receiving the energy signal, the corresponding recording cartridge for the device last receiving the signal being a distance $r$ from the axis of rotation of the recording assembly, a reproducing assembly mounted for counterrotation with said recording assembly with recording cartridges mounted thereon in identical arrangement with the cartridges on said recording assembly, a revolving magnetic belt moving in the direction from the recording assembly to the reproducing assembly and moving at a velocity $$v = V\frac{2r}{R}$$

where $V=$the velocity of the energy wave through the medium surrounding the energy source and energy detecting devices.

5. Apparatus of the type described comprising in combination compensating means connected to a plurality of energy detecting devices to compensate for the time delay between the time the energy signal reaches the closest detector to the energy source and the time the same signal reaches the other detectors, and means to determine when the time delay has been correctly adjusted, said compensating means comprising recording cartridges mounted in a rotatable assembly, reproducing cartridges mounted in a second rotatable assembly, said assemblies mounted to counter rotate with respect to each other, a revolving magnetic belt moving in a direction from said recording assembly to said reproducing assembly, said assemblies surfaces being shaped so that said cartridges are in close proximity to, and at all times equidistant from, said belt throughout the rotation of said assemblies, and means for determining the direction of the energy source.

6. Apparatus of the type described comprising in combination compensating means operatively connected to a plurality of energy detecting devices to compensate for the time delay between the time the energy signal reaches the closest detector to the energy source and the time the same signal reaches the other detectors, and means to determine when the time delay has been correctly adjusted, said compensating means comprising recording cartridges mounted in a rotatable assembly, reproducing cartridges mounted in a second rotatable assembly, said assemblies mounted to counter rotate with respect to each other, a revolving magnetic belt moving in a direction from said recording assembly to said reproducing assembly, said assemblies surfaces being shaped so that said cartridges are in close proximity to, and at all times equidistant from, said belt throughout the rotation of said assemblies, and an indicator and reading scale attached to one of said assemblies to indicate its angle of rotation for determining the direction of the energy source.

7. Apparatus of the type described comprising in combination compensating means operatively connected with a plurality of energy detecting devices to compensate for the time delay between the time the energy signal reaches the closest detector to the energy source and the time the same signal reaches the other detectors, and means to determine when the time delay has been correctly adjusted, said compensating means comprising a recording assembly with recording cartridges arranged in miniature replica of the arrangement of said energy detecting devices, a magnetic belt capable of receiving energy signals from said recording cartridges, a reproducing assembly with reproducing cartridges in identical arrangement with the arrangement of said recording cartridges on said recording assembly, both assemblies capable of being counter rotated such that said reproducing cartridges are in alignment on the same magnetic tracks on the magnetic belt as their corresponding recording cartridges, both assemblies being capable of rotation until the time delay between said energy detecting devices has been adjusted, and means for measuring the rotation of said recording assembly necessary to adjust for said time delay.

8. Apparatus of the type described including a signal delay and time compensating device comprising a recording assembly with a plurality of recording cartridges thereon spaced in miniature replica of a field array of radiant energy detecting devices, a reproducing assembly with reproducing cartridges mounted thereon in identical pattern with the cartridges on the recording assembly, said assemblies mounted to counter rotate with respect to each other, a revolving belt moving in a direction from said recording assembly to said reproducing assembly.

9. Apparatus of the type described including a signal delay and time compensating device comprising a recording assembly with a plurality of recording cartridges thereon spaced in miniature replica of a field array of radiant energy detecting devices, a reproducing assembly with reproducing cartridges mounted thereon in identical pattern with the cartridges on the recording assembly, said assemblies mounted to counter rotate with respect to each other, a revolving belt moving in a direction from said recording assembly to said reproducing assembly, said assemblies being so shaped and mounted that said cartridges are in close proximity to, and at all times equidistant from, said belt throughout the rotation of said assemblies.

10. A signal delay and time compensating device comprising a recording assembly with a plurality of recording cartridges thereon spaced in miniature replica of a field array of radiant energy detecting devices, a reproducing assembly with reproducing cartridges mounted thereon in identical pattern with the cartridges on the recording assembly, a magnetic belt revolving in close proximity to said assemblies and rotating in a direction from the recording assembly to the reproducing assembly, said assemblies mounted to counter-rotate with respect to each other such that said reproducing cartridges are in alignment on the same magnetic tracks on the magnetic belt as the corresponding recording cartridges, said assemblies being capable of rotation until the time delay between said energy detecting devices has been adjusted.

11. Apparatus of the type described including a signal delay and time compensating device comprising a revolving sphere with a magnetic recording belt thereon, recording and reproducing assemblies mounted to be rotated in close proximity to said revolving sphere, a plurality of cartridges mounted in said assemblies, said assemblies curved to conform with the curvature of the sphere at all points of close proximity, said cartridges being equidistant from said belt at all times throughout the rotation of said assemblies.

12. Apparatus of the type described including a recording cartridge comprising an outer permeable shell, an inner permeable core, coil windings around said inner core, and insulating means separating said core and windings from said outer shell at the tip of said core, the flux between said core and shell across said insulating means varying according to the variation in current in said coil windings.

13. Apparatus of the type described including a recording assembly with a plurality of cartridges thereon, said cartridges each comprising an outer shell, an inner core, coil windings around said inner core, said shell and said core being coaxial, joined at one end and spaced by insulating means at the opposite end, means to vary the current in said windings, the flux between said core and shell across said insulating means varying according to the variation in current in said coil windings.

14. Apparatus of the type described including a recording cartridge comprising an outer shell, an inner core, coil windings around said inner core and insulating means separating said core and windings from said outer shell at the tip of said core, the flux between said core and shell across said insulating means varying according to the variation in current in said coil windings, and a magnetic belt revolving in close proximity to said tip and recording the variations of magnetic flux betwen said tip and said shell.

15. Apparatus of the type described including a recording cartridge comprising an outer shell with a small slot extending from end to end along a side thereof, an inner core, coil windings around said inner core, and insulating means separating said core and windings from said outer shell at the tip of said core, the flux between said core and shell across said insulating means varying according to the variation in current in said coil windings.

16. Apparatus of the type described including a recording assembly with a plurality of spaced cartridges thereon, said cartridges each comprising an outer shell, an inner core, coil windings around said inner core and insulating means separating said core and windings from said outer shell at the tip of said core, means to vary the current in said windings, the flux between said core and shell across said insulating means varying according to the variation in current in said coil windings, a magnetic belt revolving in close proximity to said tip and recording the variations of magnetic attraction of said tip, a reproducing assembly having cartridges identical in type and spacing as the cartridges on said recording assembly for reproducing the magnetic variations on said magnetic belt.

17. In a device of the class described, a magnetic signal storage medium movable in a predetermined direction, a first set of reading heads mounted adjacent said medium, a second set of recording heads mounted adjacent said medium, each head of said first set being aligned with a corresponding head of said second set in said direction of storage medium movement and spaced therefrom by a predetermined distance, and means for simultaneously shifting at least two heads of one of said sets to vary the respective distances between each of said two heads and their corresponding head of the other set in unequal amounts in accordance with a predetermined relation between said two distances, said sets maintaining alignment throughout said shifting movement.

18. In a device of the type described, a magnetic signal storage medium movable in a predetermined direction, recording cartridges mounted on one assembly in close proximity to said medium, reproducing cartridges mounted in a second assembly in close proximity to said medium, each of said reproducing cartridges being in alignment respectively with each of said recording cartridges in the direction of storage medium movement, means for moving cartridges in at least one assembly relative to cartridges in the other assembly in the direction of said storage movement while maintaining said alignment throughout said assembly movement.

References Cited in the file of this patent

UNITED STATES PATENTS

| | | |
|---|---|---|
| 2,424,773 | Reiber | July 29, 1947 |
| 2,427,421 | Reiber | Sept. 16, 1947 |
| 2,533,499 | Munson | Dec. 12, 1950 |